United States Patent [19]
Weber

[11] 4,103,355
[45] Jul. 25, 1978

[54] MIXING EXTRUDER

[75] Inventor: Dietmar Weber, Hamburg, Fed. Rep. of Germany

[73] Assignee: Fried. Krupp Gesellschaft mit beschränkter Haftung, Essen, Fed. Rep. of Germany

[21] Appl. No.: 719,816

[22] Filed: Sep. 1, 1976

Related U.S. Application Data

[63] Continuation of Ser. No. 565,213, Apr. 4, 1975, abandoned.

[30] Foreign Application Priority Data

Apr. 8, 1974 [DE] Fed. Rep. of Germany ....... 2417116

[51] Int. Cl.² .............................................. B29B 1/06
[52] U.S. Cl. ....................................... 366/90; 366/322
[58] Field of Search ................ 259/191, 192, 193, 97, 259/9; 425/10, 244, 207, 208, 209

[56] References Cited

U.S. PATENT DOCUMENTS

| 2,514,884 | 7/1950 | Maynard | 425/244 |
| 3,215,408 | 11/1965 | Hansen | 259/97 |
| 3,350,742 | 11/1967 | Wood | 259/191 |
| 3,823,921 | 7/1974 | Brennan | 259/192 |

Primary Examiner—Harvey C. Hornsby
Attorney, Agent, or Firm—Walter Becker

[57] ABSTRACT

A mixing extruder with an extruder worm for processing rubber and synthetic materials, which has three regions following each other in its feeding direction. The first one of these regions represents a mixing chamber which can be closed at intervals at all sides. The second region is formed by a storage zone for securing a smooth change-over from discontinuously feeding the extruder to continuously feeding the extruder, and the third region is designed as an ejection zone for feeding material in the extruder to the discharge opening thereof.

6 Claims, 4 Drawing Figures

MIXING EXTRUDER

This is a continuation of application Ser. No. 565,213, filed Apr. 4, 1975 now abandoned.

The present invention relates to a mixing extruder with an extruder worm for processing rubber and synthetic materials.

The heretofore known mixing extruders for the production of rubber and synthetic material mixtures, in other words, very viscous and sticky materials, which are difficult to be dosed, require special steps during or prior to the feeding in order to be able to fully exploit the generally good mixing effect of the extruder. For instance the components to be intermixed are dimunited prior to being fed to the mixture and are formed into pellets, balls, or the like. In order to maintain the material in flowable condition, additions are added which are intended to prevent the sticking of the particles to each other. The dosing devices still required are expensive and complicated.

Instead of the above mentioned preparations, in many instances the rubber mixtures are prepared by means of two shaft kneaders, which mixtures are fed in batches and are then introduced into the extruder or a mill. In this connection, therefore, at least two machines are required. In each instance, the preparation of the mixture requires considerable time, space and costs.

It is, therefore, an object of the present invention to avoid the above mentioned drawbacks and so to design an extruder that it will be able to process not only materials which have been prepared but can be fed in a discontinuous manner with non-prepared mixing ingredients and will discharge the complete mixture in a continuous manner.

These and other objects and advantages of the invention will appear more clearly from the following specification in connection with the accompanying drawings, in which.

Figure 1:
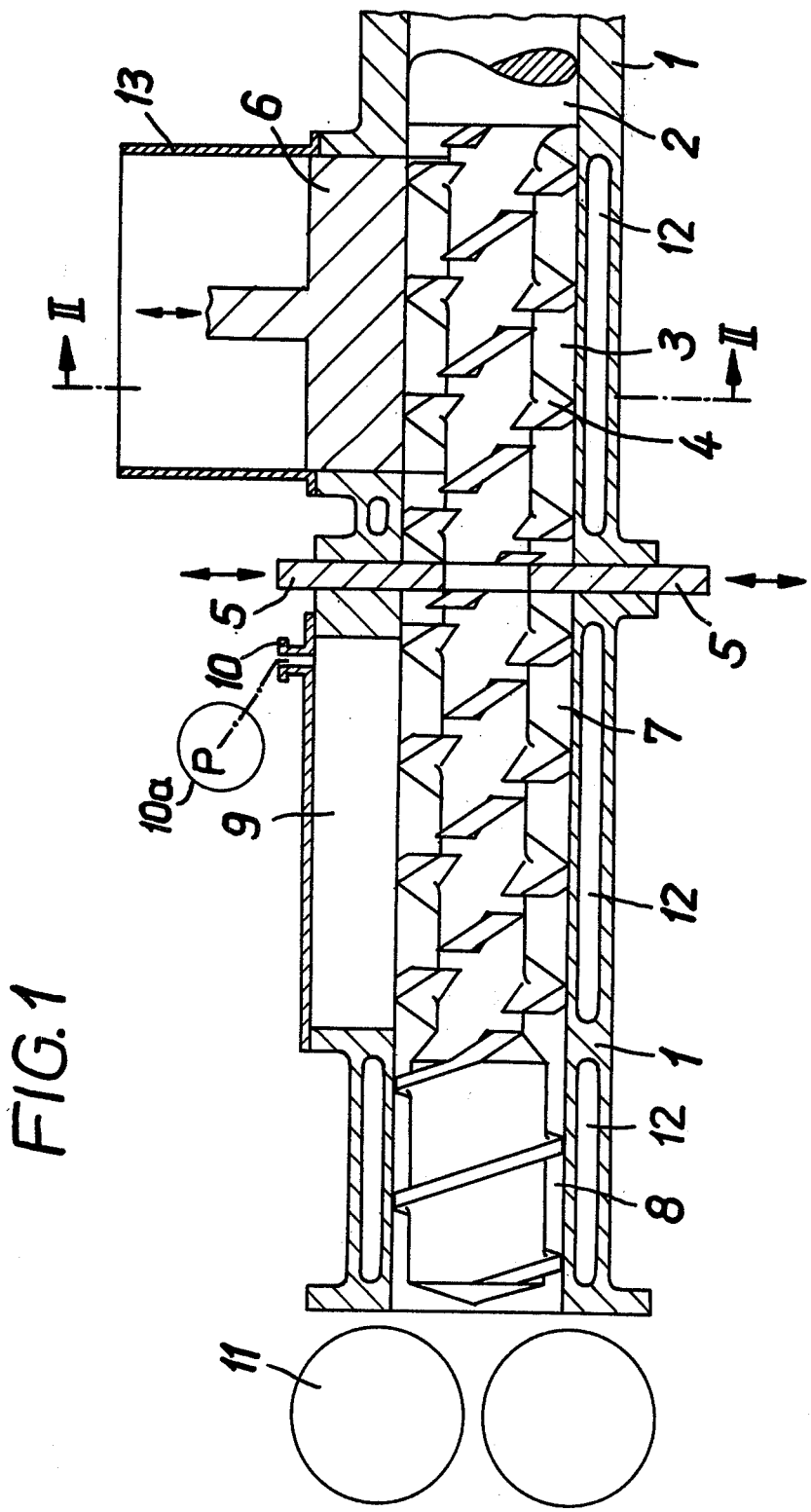
FIG. 1 illustrates a longitudinal section through a mixing extruder according to the invention.

The mixing extruder according to the present invention is characterized by three regions which succeed each other in the feeding direction and of which the first region is designed as a mixing chamber adapted at intervals to be closed on all sides, while the second region is designed as storing zone which is sufficiently large for the change from a discontinuous feeding to a continuous further processing, and while the third region is designed as ejecting zone substantially for feeding the material to the mouth of the extruder. In this way, a preparation of the material for the intermixing and also a rather intensive pre-mixing is obtained in the mixing chamber at a relatively low cost. The storing zone assures a continuous supply to the feeding zone in which the mixing operation is completed.

According to a particularly advantageous further development of the invention, the mixing chamber comprises a hopper for the feeding, which hopper is provided with a stuffing device for instance in the form of a hydraulically or pneumatically driven stuffing piston. The mixing chamber furthermore comprises a shut-off device which may include two valves and is arranged at the outlet. The mixing chamber furthermore comprises an extruder worm which will assure a good intermixing of the material while the mixing chamber is closed and will also assure a good feeding of the material while the mixing chamber is open. In this way, the essential parts of the material treatment as to the feeding and dosing and also as to the mixing of the processing material are combined in the mixing chamber. Advantageously, the storing zone is equipped with a degasifying device. This arrangement is particularly favorable inasmuch as here no high inner pressure prevails but any inherent gas quantities are already to a major extent eliminated from the material.

Referring now to the drawings in detail, an extruder worm 2 operates in an extruder housing 1. In the inlet region which forms the mixing chamber 3, the extruder worm 2 is equipped with worm webs 4 which in a manner known per se act as feeder as well as mixer, and accordingly may have for instance perforations or gaps. By means of a shut-off device 5 at the end of a mixing chamber 3 and by a stuffing device 6, the mixing chamber 3 is closed on all sides. The mixing chamber 3 is followed in feeding direction by a storing zone 7 which in turn is followed by an ejecting zone 8. The storing zone 7 is provided with a pocket 9 outside the contour of the worm. The pocket 9 has a sufficiently large capacity so that pressure shocks during the opening of the mixing chamber 3 cannot spread into the ejecting zone 8. The pocket 9 is equipped with a connection 10 for a vacuum pump 10a which is provided for degasifying the material in the storing zone 7. An extruder worm 2 presses the finished mixed material from the ejection zone 8 against a roller pair 11 at the extruder mouth by means of which it is formed into a "skin". Hollow chambers 12 serve as passages for cooling water.

Figure 2:
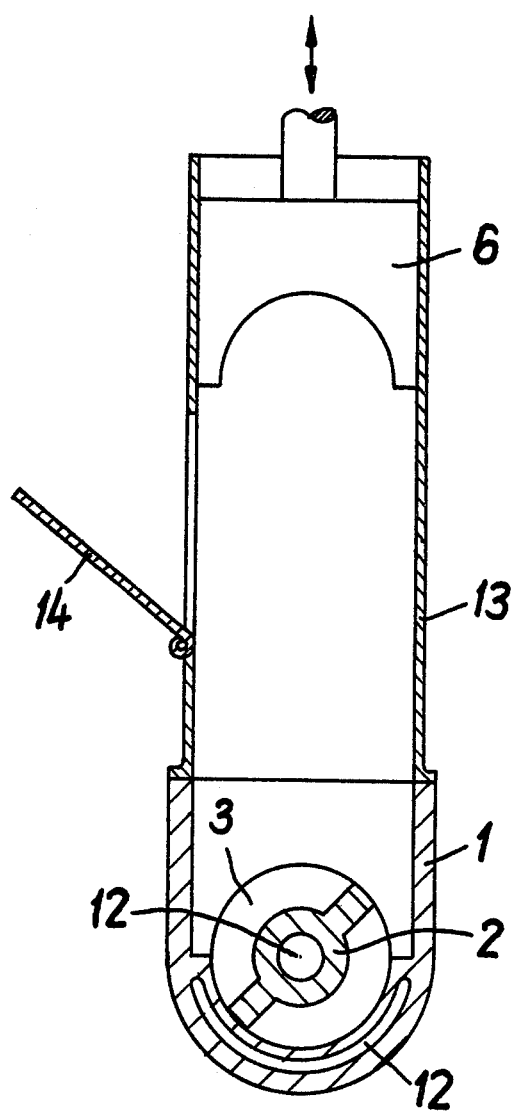
FIG. 2 represents a cross section taken along the line II—II of FIG. 1.
Figure 3:
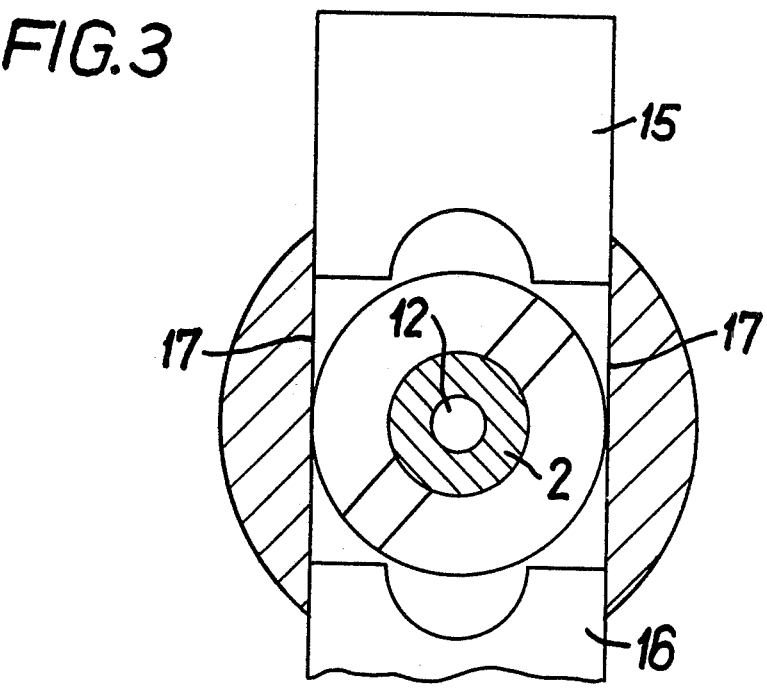
FIG. 3 represents a cross section through the open shut-off device forming a part of the extruder of the invention.
Figure 4:
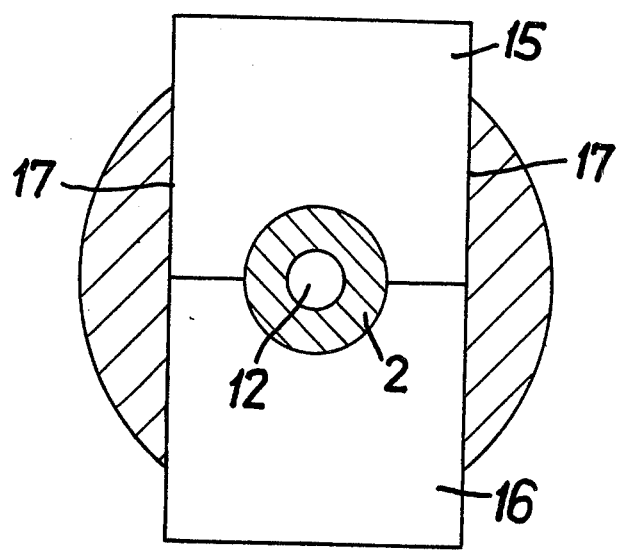
FIG. 4 is a cross section through the shut-off device of FIG. 3 in closed condition.

The feeding of the extruder is effected through the intervention of a charging chute 13 and via a lateral flap 14 (FIG. 2), said chute 13 being equipped with a stuffing or pushing device 6. Subsequently, the device 6 presses the material into the mixing chamber 3 while simultaneously forming a closure relative to the opening of the charging chute 13. Also the shut-off device 5 is closed, and the material is subjected to an intensive intermixing process. After the mixing operation has been completed, the shut-off device 5 comprising two valves 15 and 16 operable by a pneumatic or hydraulic cylinders in guiding means 17, is opened, and the worm part of the mixing changer 3 feeds the material into the storing zone 7. After the mixing chamber 3 has been emptied, the shut-off device 5 is closed again, and the mixed charge of material is introduced into the mixing chamber 3.

It is, of course, to be understood that the present invention is, by no means, limited to the specific showing in the drawings, but also comprises any modifications within the scope of the appended claims.

What I claim is:

1. A mixing extruder for mixing successive batches of material and for ejecting material continuously through an outlet, comprising in combination a single housing having a passage therethrough to said outlet, a unitary extruder worm formed with spiral webs and extending through said passage to said outlet at one end, a material inlet at the opposite end of said passage from said outlet to form with said passage a mixing chamber zone, an ejecting zone at the end of said passage adjacent said outlet in which said extruder worm feeds material through said outlet, a storing zone between said ejecting zone and said mixing chamber zone including a space opening to said passage to receive and store material from said mixing chamber zone, blocking means between said mixing chamber zone and said storing zone operable to block completely movement of material from said mixing chamber zone and alternately to open said passage to allow such movement fully to said storing zone, said mixing chamber zone having a closure member for said material inlet to exert pressure on said material and to confine said material in said mixing chamber zone and by said blocking member, the spiral webs of said worm in said mixing chamber zone being interrupted to provide spaces between successive portions of said web for mixing said material, said space in said storing zone receiving material from a batch mixed in said mixing chamber zone when said blocking means is operated to open said passages, said worm extending as a unit over three zones including the mixing chamber, storing and ejecting zones for continuously feeding material in said storing zone through said outlet, whereby successive batches of material may be mixed discontinuously in said mixing chamber zone while preceding batches are fed continuously uniformly from said storing zone through said outlet.

2. A mixing extruder for mixing successive batches of material and for ejecting material continuously through an outlet comprising in combination a single housing having a passage therethrough to said outlet at one end, a unitary extruder worm formed extending through said passage to said outlet for feeding material through said passage, a material inlet at the opposite end of said passage from said outlet to form with said passage a mixing chamber zone, a closure member for said inlet, an ejecting zone at the end of said passage adjacent said outlet in which said extruder worm feeds material through said outlet, a storing zone between said ejecting zone and said mixing chamber zone, including a space opening to said passage to receive and store material from said mixing chamber zone, blocking means between said mixing chamber zone and said storing zone and operable to block completely movement of material from said mixing chamber zone and alternately to open said passage to allow such movement fully to said storing zone, whereby a batch of said material may be mixed in said mixing chamber zone with said closure member and blocking means in their closed positions, and the batch may be transferred by said worm to said storing zone upon opening said passage by operation of said blocking means to store said batch in said storing zone and feed the material continuously uniformly to said outlet while a successive batch is being mixed discontinuously in said mixing chamber zone, said worm extending as a unit over three zones including the mixing chamber, storing, and ejecting zones.

3. A mixing extruder in combination as claimed in claim 2, in which said blocking means comprises movable means carried by said housing movable into engagement with the shaft of said extruder worm.

4. A mixing extruder in combination as claimed in claim 2, in which said inlet is in the form of a chute and said closure member is slidable in said chute, said closure member being operable to exert pressure on the material in said mixing chamber.

5. The method of mixing material discontinuously in separate batches and extruding said mixed material continuously uniformly, said method comprising in combination continuously rotating a unitary worm in a longitudinal passage, mixing said material in a batch by said worm in a closed chamber zone formed at one end of said passage, opening said passage from said mixing chamber zone and conveying said material by said worm in steps to an adjacent storing zone having a space opening to said passage to receive and store said material, feeding said material by said worm fully from said storing zone through an ejecting zone formed by said passage to an outlet, and completely closing said passage between said mixing chamber and said storing zone and mixing another batch of material in said mixing chamber while said worm is continuously feeding material from said storing zone to said outlet, said worm extending as a unit operating simultaneously over three zones including the mixing chamber, storing, and ejecting zones.

6. The method of mixing and extruding material in combination as claimed in claim 5, which includes exerting pressure on said material with a closure in said mixing chamber.

* * * * *